US010118588B2

(12) United States Patent
 Shimizu et al.

(10) Patent No.: US 10,118,588 B2
(45) Date of Patent: Nov. 6, 2018

(54) SEAT BELT DEVICE

(71) Applicant: HONDA MOTOR CO., LTD., Tokyo (JP)

(72) Inventors: Takayuki Shimizu, Wako (JP); Tatsuya Miyamoto, Wako (JP); Takamitsu Kasai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/452,226

(22) Filed: Mar. 7, 2017

(65) Prior Publication Data

US 2017/0259777 A1 Sep. 14, 2017

(30) Foreign Application Priority Data

Mar. 8, 2016 (JP) .................................. 2016-044023

(51) Int. Cl.
 *B60R 22/20* (2006.01)
 *B60R 22/26* (2006.01)
 *B60R 22/22* (2006.01)
 *B60R 22/18* (2006.01)

(52) U.S. Cl.
 CPC .............. *B60R 22/20* (2013.01); *B60R 22/22* (2013.01); *B60R 22/26* (2013.01); *B60R 2022/1806* (2013.01); *B60R 2022/266* (2013.01)

(58) Field of Classification Search
 CPC combination set(s) only.
 See application file for complete search history.

(56) References Cited

U.S. PATENT DOCUMENTS

| 6,581,969 B2 * | 6/2003 | Nishide .................. B60R 22/22 |
| | | 280/801.1 |
| 2013/0126693 A1 | 5/2013 | Khaitan |
| 2017/0253214 A1 * | 9/2017 | Klaassen ................ B60R 22/03 |

FOREIGN PATENT DOCUMENTS

| DE | 29 31 552 A1 | 2/1981 | |
| FR | 2726521 A1 * | 5/1996 | ............. B60R 22/22 |
| FR | 2726521 A1 | 5/1996 | |
| GB | 2402370 A | 12/2004 | |
| GB | 2515538 A * | 12/2014 | ............. B60R 22/18 |
| JP | 56-102756 U | 8/1981 | |
| JP | 10-203304 A | 8/1998 | |
| JP | 2002-283954 A | 10/2002 | |

(Continued)

OTHER PUBLICATIONS

Office Action dated Aug. 29, 2017, issued in counterpart Japanese Application No. 2016-044023, with English machine translation. (10 pages).

(Continued)

*Primary Examiner* — Nicole T Verley
(74) *Attorney, Agent, or Firm* — Westerman, Hattori, Daniels & Adrian, LLP (57) ABSTRACT

A seat belt device 30 includes a second buckle 48 connected to a vehicle 10 side by a second webbing 49, and a tubular buckle hoder 46 which is able to hold the second buckle 48 in a state in which the second buckle 48 is accommodated therein. A tongue 76 is inserted into the second buckle 48. In addition, the buckle holder 46 is provided on an anchor 32 so as to be rotatable in vehicle forward and rearward directions. Furthermore, a length dimension L1 of the second webbing 49 is set such that the second buckle 48 can be pulled out from the buckle holder 46.

9 Claims, 8 Drawing Sheets

(56) References Cited

FOREIGN PATENT DOCUMENTS

JP          2009-262633 A    11/2009
WO          2014/060680 A2   4/2014

OTHER PUBLICATIONS

Office Action dated Jan. 23, 2018, issued in counterpart Japanese Application No. 2016-044023, with English translation (17 pages).

* cited by examiner

Fig.8

SEAT BELT DEVICE

CROSS-REFERENCE OF RELATED APPLICATION

This application claims priority of Japanese Patent Application No. 2016-044023 filed in Japan on Mar. 8, 2016, the entire contents of which are incorporated herein by reference.

TECHNICAL FIELD

The present invention relates to a seat belt device which holds a webbing with a buckle to secure an occupant with the held webbing.

BACKGROUND OF THE INVENTION

As a seat belt device for an automobile, a seat belt device in which a steel carrier is rotatably supported by an anchor (stopper) on a vehicle side so as to follow the forward inclination of a seat back and a buckle is mounted the carrier is known.

According to the seat belt device, by rotating the buckle so as to follow the forward inclination of the seat back, the buckle can be disposed at a preferable position according to the state of the seat back (for example, refer to Japanese Laid-Open Patent Publication No. H10-203304).

However, there is a 3 passenger seat among the seats of an automobile, and the 3 passenger seat is formed so that the center seat has a smaller seat width than those of the right and left seats. It is conceivable to use a seat belt device of Japanese Laid-Open Patent Publication No. H10-203304 for the 3 passenger seat.

However, in a case where an occupant of large build sits in the center seat or a child seat is mounted thereon, the buckle of the seat belt device is positioned below the occupant or the child seat. Therefore, it is difficult to use buckles.

As a countermeasure against this, it is conceivable to cause a buckle to protrude upward from the surface of a seat cushion. However, a carrier of Japanese Laid-Open Patent Publication No. H10-203304 is formed of steel. Therefore, it is difficult to dispose the buckle according to an occupant of large build or a child seat.

Therefore, when an occupant of large build sits in the center seat, the buckle may come into contact with the occupant and there is a possibility of the occupant feeling uncomfortable.

SUMMARY OF INVENTION

An object of the present invention is to provide a seat belt device which can cause a buckle to be disposed at a preferable position by causing the buckle to follow the state of a seat back when the buckle is not in use, and can be applied to an occupant of large build or a child seat when the buckle is in use.

According to a first embodiment of the present invention, there is provided a seat belt device which is provided in a vehicle and secures an occupant with a first webbing, including: a buckle into which a tongue connected to the first webbing can be inserted and which is connected to the vehicle side by a second webbing, a tubular buckle holder which is able to hold the buckle in a state in which the buckle is accommodated therein and is provided in the vehicle so as to be rotatable in vehicle forward and rearward directions, wherein the second webbing is set to have a length such that the buckle can be pulled out from the buckle holder.

As described above, the tubular buckle holder is provided in the vehicle so as to be rotatable in the vehicle forward and rearward directions, and the buckle can be held in a state in which the buckle is accommodated in the buckle holder. Therefore, in a case where the buckle is not in use, the buckle can be held in a state in which the buckle is accommodated in the buckle holder.

Accordingly, the buckle can be prevented from causing interference. In addition, by holding the buckle in the buckle holder, the buckle can be disposed at a preferable position to follow the state of a seat back (so-called seat arrangement).

Furthermore, the buckle is connected to the vehicle by the second webbing, and the length of the second webbing is set such that the buckle can be pulled out from the buckle holder. Therefore, for example, in a case where an occupant of large build uses the seat belt device, the buckle can be pulled out from the buckle holder and disposed on the side of the occupant. Accordingly, the seat belt device can be used by inserting a tongue into the buckle.

Moreover, even in a case where a child seat is mounted, the buckle can be pulled out from the buckle holder and disposed on the side of the child seat. Accordingly, the child seat can be mounted using the buckle.

According to a second embodiment of the invention, the second webbing is preferably connected to the vehicle side within a holder width of the buckle holder.

As described above, the second webbing is connected to the vehicle side within the holder width in the vehicle width direction of the buckle holder. Therefore, for example, when the buckle is pulled out from the buckle holder due to a frontal collision, the second webbing hardly interferes with the buckle holder.

Accordingly, the possibility that a high load may be applied to the buckle holder by the second webbing can be prevented. Therefore, the buckle holder can be prevented from being damaged by the interference of the second webbing.

According to a third embodiment of the invention, the buckle holder preferably has a recessed portion which is formed in an upper end portion of the buckle holder on a side opposite to a seat in which the occupant is seated, and is recessed downward.

As described above, the recessed portion is formed in the upper end portion of the buckle holder on the side opposite to the seat. Therefore, when the buckle is pulled out for use, the buckle can be received by the recessed portion.

Accordingly, the degree of freedom of disposing the buckle in a direction away from the seat can be increased. Therefore, the buckle can be applied to occupants of various builds and be disposed.

According to a fourth embodiment of the invention, the buckle holder preferably has an opening which is formed in a base end portion of the buckle holder and through which the second webbing in the buckle holder is able to move toward outside of the buckle holder.

As described above, the opening is formed in the base end portion of the buckle holder, and the second webbing in the buckle holder can be moved toward the outside from the opening. Therefore, when the buckle is accommodated inside the buckle holder, the second webbing in the buckle holder can be released toward the outside of the buckle holder. Accordingly, the buckle can be smoothly accommodated inside the buckle holder.

Effect of the Invention

According to the embodiments of the present invention, when the buckle is not in use, the buckle is accommodated in the buckle holder. Accordingly, the buckle can be disposed at a preferable position to follow the state of the seat back.

Furthermore, when the buckle is in use, the buckle is pulled out from the buckle holder. Accordingly, the buckle can be applied to an occupant of large build or a child seat.

MODE FOR CARRYING OUT THE INVENTION

A preferred embodiment of the present invention will now be described with reference to the accompanying drawings. In addition, "front (Fr)", "rear (Rr)", "left (L)", and "right (R)" follow directions viewed from a driver.
<Embodiment>
As a seat belt device according to an embodiment, a right seat belt device 30 and a left seat belt device 31 will be described.

Figure 1:
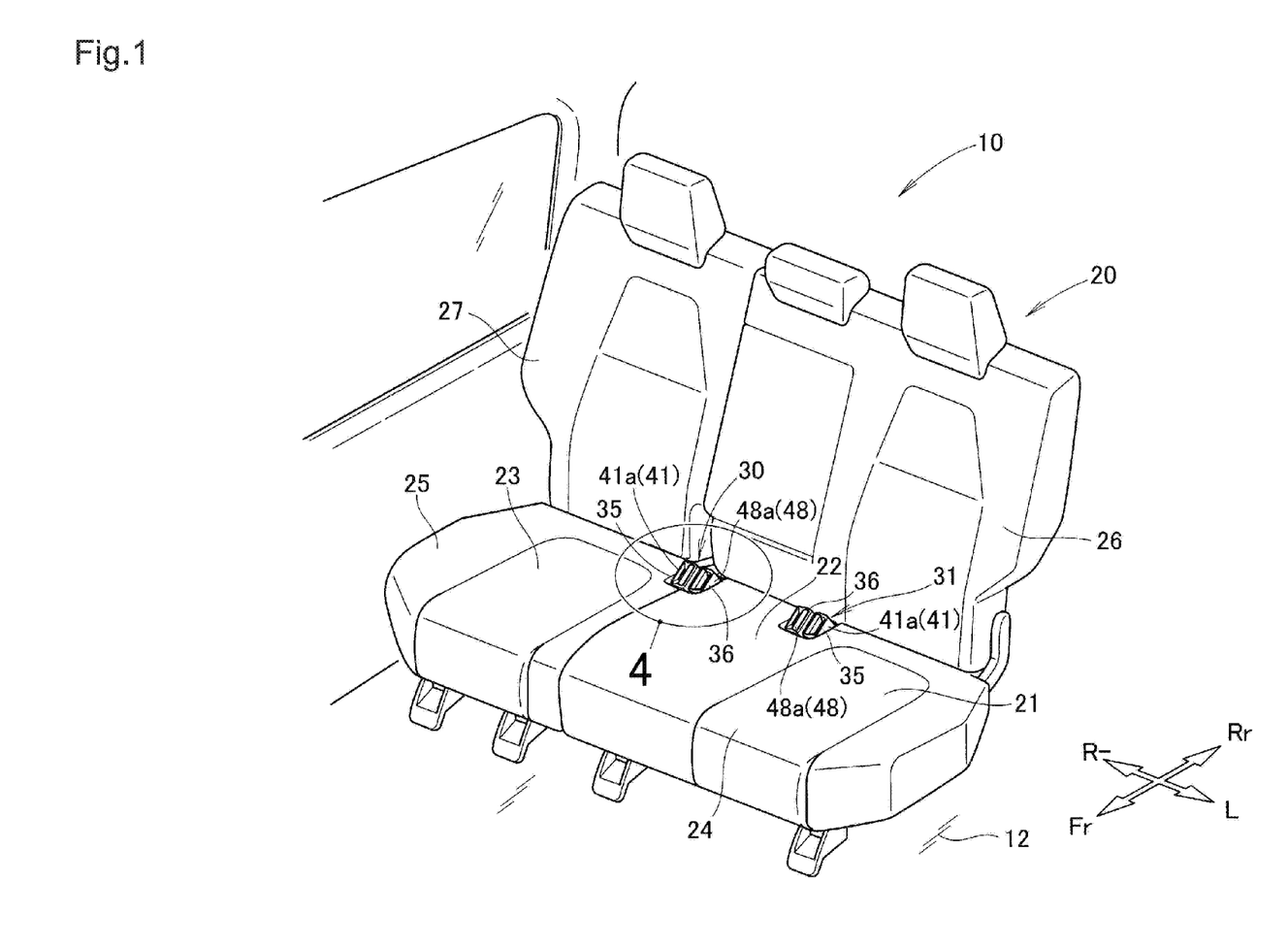
FIG. 1 is a perspective view illustrating a 3 passenger seat provided with a seat belt device according to the present invention.

As illustrated in FIG. 1, a 3 passenger seat 20 is provided in a rear part 12 of a vehicle 10. The 3 passenger seat 20 is a so-called bench seat provided with seats adjacent to each other in the order of a left seat 21, an inner seat (seat) 22, and a right seat 23 from the left in a vehicle width direction.

The 3 passenger seat 20 includes a main seat cushion 24 for the left seat 21 and the inner seat 22, a sub-seat cushion 25 for the right seat 23, a main seat back 26 for the left seat 21 and the inner seat 22, and a sub-seat back 27 for the right seat 23.

An occupant sits on each of the left seat 21, the inner seat 22, and the right seat 23.

Furthermore, the 3 passenger seat 20 includes the right seat belt device 30 between the right seat 23 and the inner seat 22 and the left seat belt device 31 between the left seat 21 and the inner seat 22.

A first buckle 41 on the outside in the vehicle width direction of the right seat belt device 30 is disposed adjacent to the inside in the vehicle width direction of the right seat 23 and is used for the right seat 23. In addition, the first buckle 41 on the outside in the vehicle width direction of the left seat belt device 31 is disposed adjacent to the inside in the vehicle width direction of the left seat 21 and is used for the left seat 21.

Moreover, a second buckle 48 on the inside in the vehicle width direction of the right seat belt device 30 is disposed adjacent to the right in the vehicle width direction of the inner seat 22. In addition, the second buckle 48 on the inside in the vehicle width direction of the left seat belt device 31 is disposed adjacent to the left in the vehicle width direction of the inner seat 22.

The second buckle 48 adjacent to the right in the vehicle width direction of the inner seat 22 and the second buckle 48 adjacent to the left in the vehicle width direction of the inner seat 22 are used for the inner seat 22.

In addition, the right seat belt device 30 and the left seat belt device 31 have a substantially bilaterally symmetric configuration, and in order to facilitate understanding of the configuration, like elements of the right and left seat belt devices 30 and 31 which are the same are denoted by like reference numerals in the description.

Figure 2:
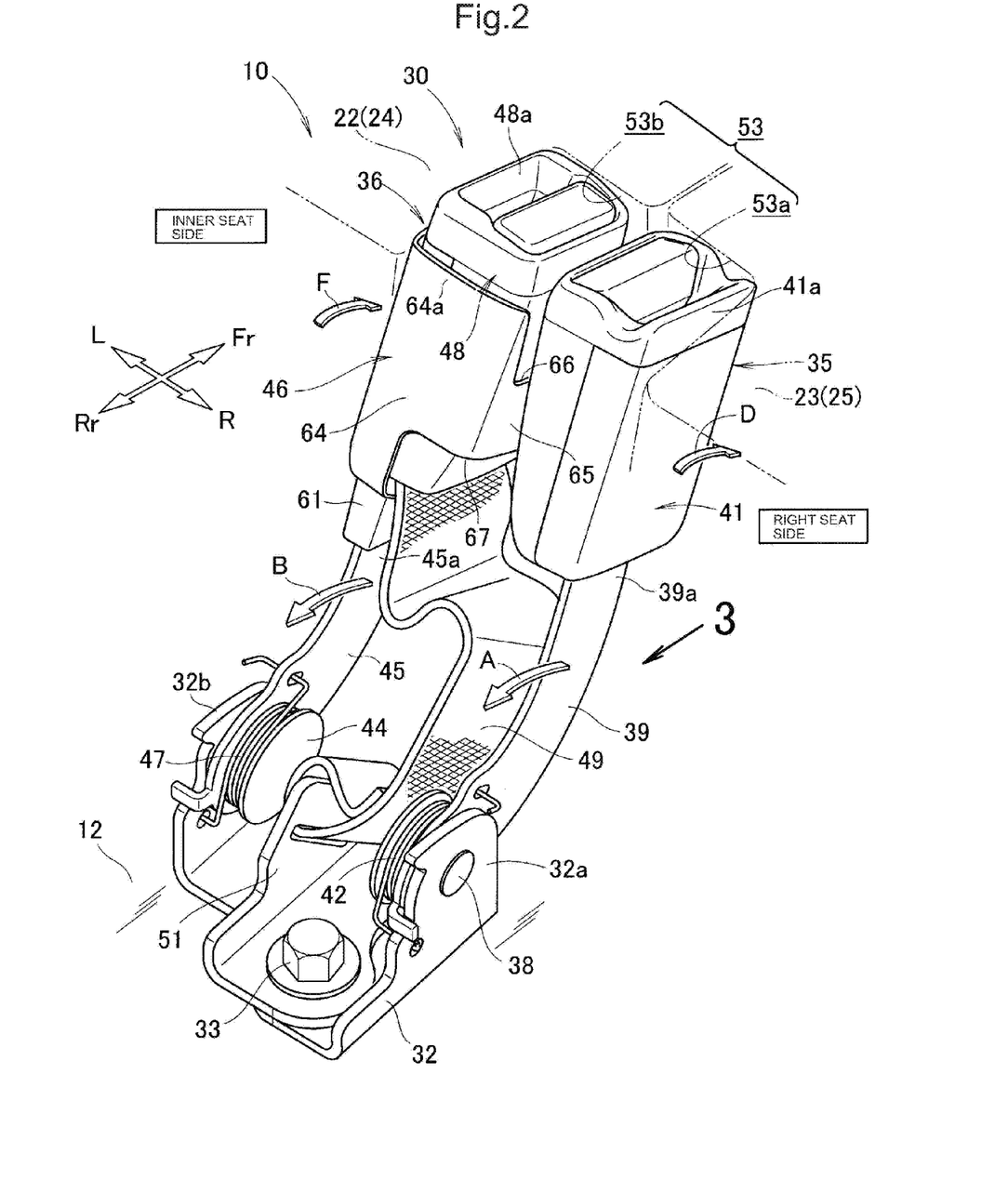
FIG. 2 is a perspective view illustrating a right seat belt device of FIG. 1.
Figure 3:
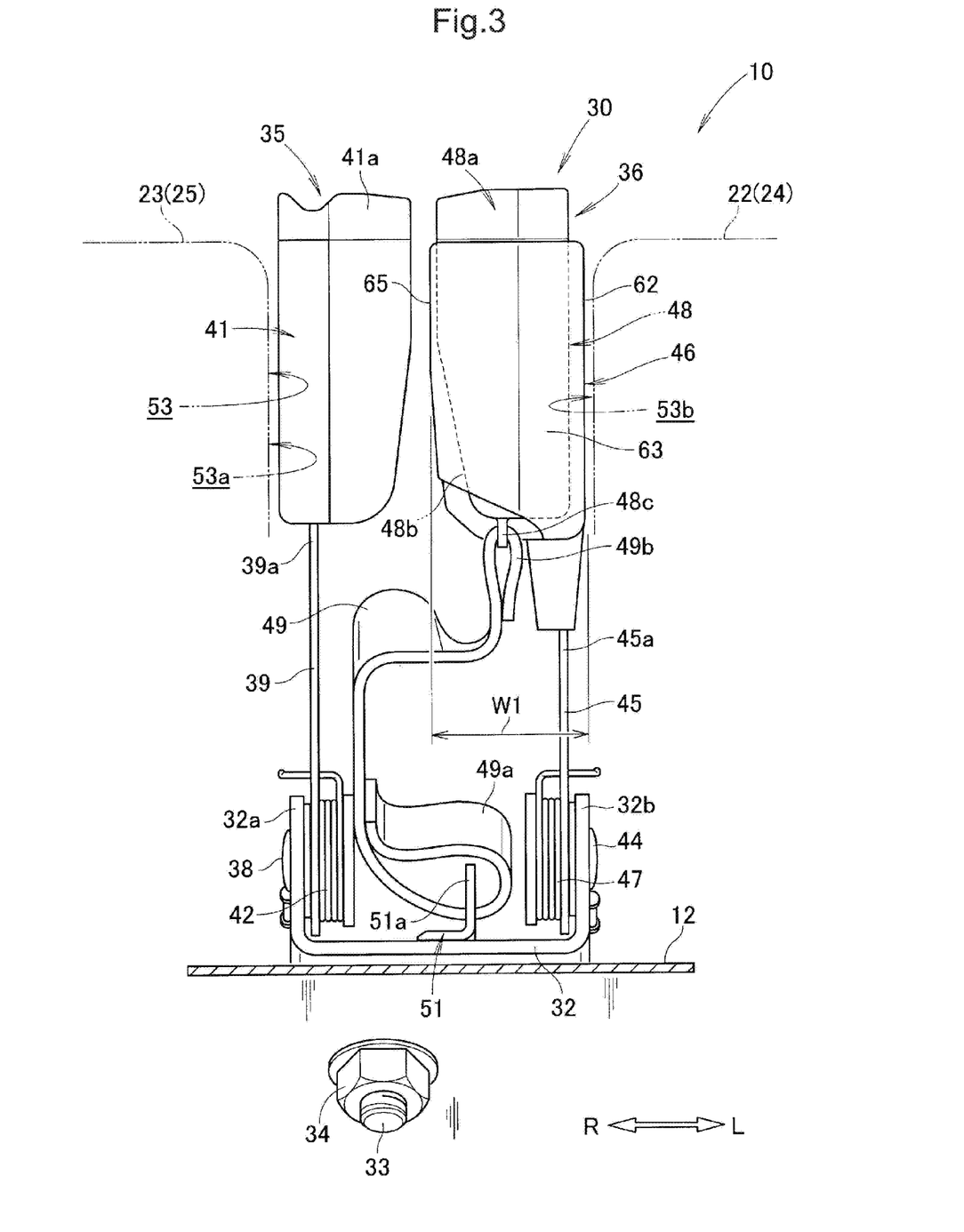
FIG. 3 is a view taken along arrow 3 of FIG. 2.

As illustrated in FIGS. 2 and 3, the right seat belt device 30 includes an anchor 32 mounted on the rear part 12 side of the vehicle 10 with a bolt 33 and a nut 34, seat belt means 35 for the right seat 23, which is mounted to the anchor 32, and seat belt means 36 for the inner seat 22, which is mounted to the anchor 32.

The seat belt means 35 for the right seat 23 includes a first carrier 39 rotatably supported by a right support portion 32a of the anchor 32 via a support pin 38, a first buckle 41 fixed to an end portion 39a of the first carrier 39, and a first spring member 42 which biases the first carrier 39 in a direction of arrow A (rearward of the vehicle).

The first carrier 39 (that is, the first buckle 41) is rotatably supported by the support pin 38 in vehicle forward and rearward directions. Furthermore, the first spring member 42 is formed in a coil shape and is fitted to the support pin 38.

The seat belt means 36 for the inner seat 22 includes a second carrier 45 rotatably supported by a left support portion 32b of the anchor 32 via a support pin 44, a buckle holder 46 fixed to an end portion 45a of the second carrier 45, and a second spring member 47 which biases the second carrier 45 in a direction of arrow B (rearward of the vehicle).

The second carrier 45 (that is, the buckle holder 46) is rotatably supported by the support pin 44 in the vehicle forward and rearward directions. Furthermore, the second spring member 47 is formed in a coil shape and is fitted to the support pin 44.

The seat belt means 36 for the inner seat 22 includes the second buckle (buckle) 48 which can be accommodated in the buckle holder 46, a second webbing 49 connected to the second buckle 48, and a mounting bracket 51 which causes the second webbing 49 to be mounted to the anchor 32.

In a state in which the second buckle 48 is accommodated in the buckle holder 46, the second buckle 48 is held in the buckle holder 46. Therefore, in a case where the second buckle 48 is not used to secure the occupant because the occupant does not sit in the inner seat 22, the second buckle 48 can be held in a state of being accommodated in the buckle holder 46. Accordingly, for example, the second buckle 48 can be prevented from interfering with the occupant sitting in the right seat 23.

Furthermore, the mounting bracket 51 is fastened together with the anchor 32 to the rear part 12 side of the vehicle 10 by a bolt 33 and a nut 34. Therefore, the second buckle 48 is connected to the rear part 12 side of the vehicle 10 by the second webbing 49.

Figure 4:
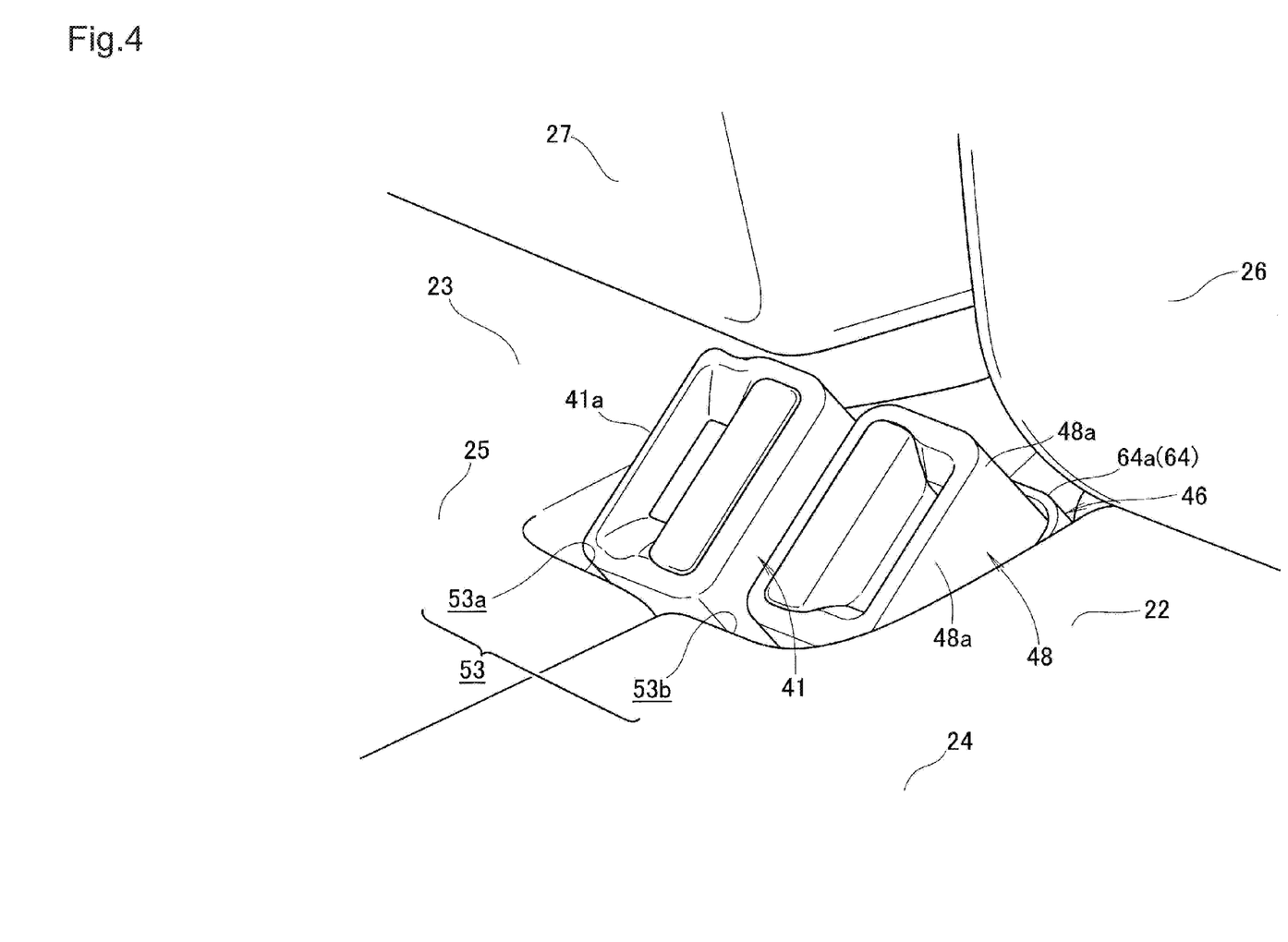
FIG. 4 is an enlarged view of part 4 of FIG. 1.

As illustrated in FIG. 4, the right seat belt device 30 is disposed in a cushion opening 53 between the main seat cushion 24 and the sub-seat cushion 25. In this state, the first buckle 41 for the right seat 23 and the second buckle 48 for the inner seat 22 are exposed from the cushion opening 53.

Specifically, a top end (upper peripheral edge) portion 41a of the first buckle 41 and a top end (upper peripheral edge) portion 48a of the second buckle 48 are exposed from the cushion opening 53.

Figure 5A:
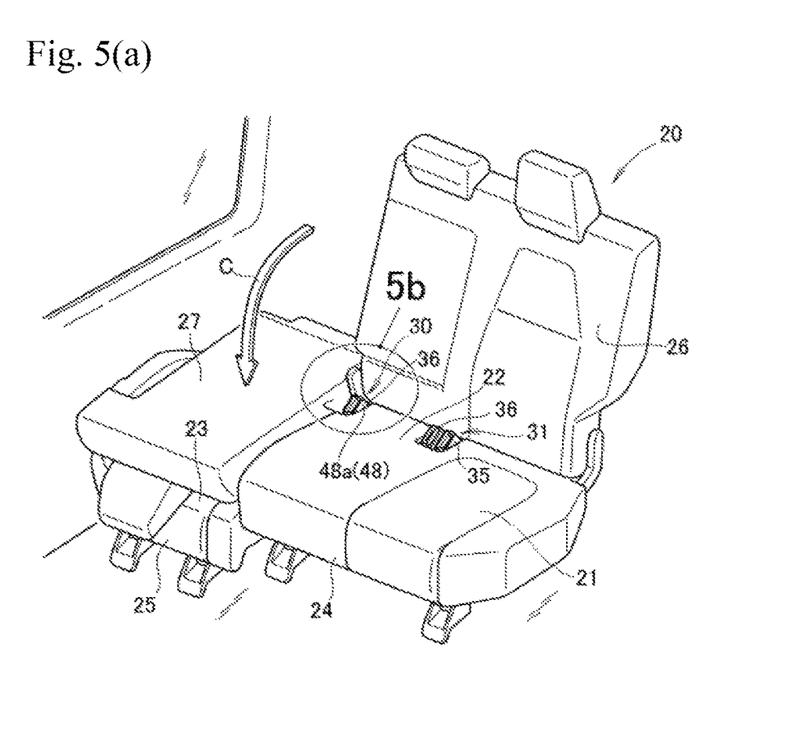
FIGS. 5(a) and 5(b) are perspective views illustrating a state in which a sub-seat back of the seat belt device of FIG. 1 is inclined forward.

As illustrated in FIGS. 2 and 5(a), due to the seat arrangement of the 3 passenger seat 20, when the sub-seat back 27 for the right seat 23 is inclined forward in a direction of arrow C, the first buckle 41 is rotated toward the front of the vehicle as indicated by arrow D to follow the sub-seat back 27.

That is, as the sub-seat back 27 is inclined forward, the first buckle 41 is rotated in the direction of arrow D about the support pin 38 against the biasing force of the first spring member 42.

Figure 5B:
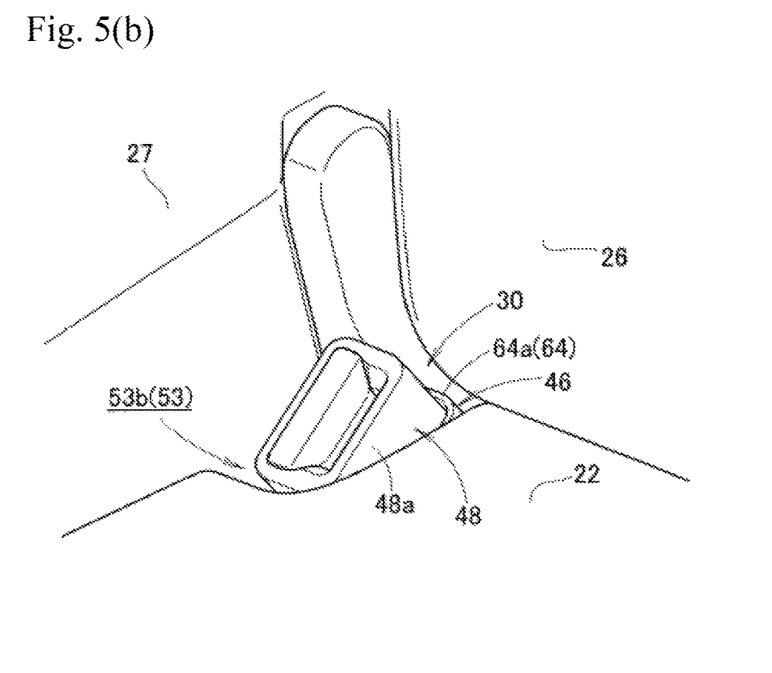

As illustrated in FIG. 5(b), in a state in which the sub-seat back 27 for the right seat 23 is inclined forward, an outer opening 53a of the cushion opening 53 and the first buckle 41 (see FIG. 2) are covered with the sub-seat back 27.

In this state, only the upper end portion 48a of the second buckle 48 is exposed from an inner opening 53b of the cushion opening 53.

Figure 6:
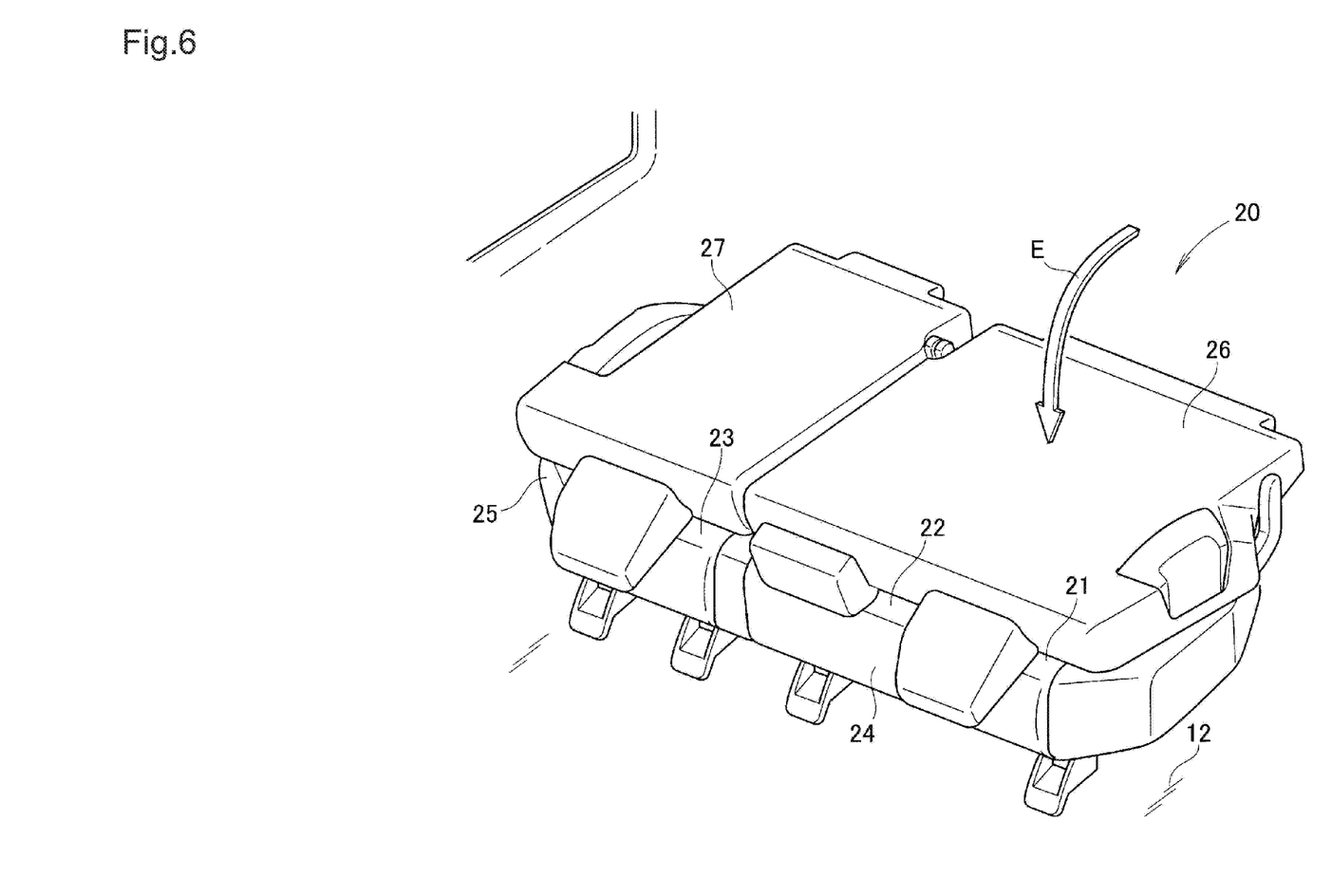
FIG. 6 is a perspective view illustrating a state in which a main seat back of the seat belt device of FIG. 1 is inclined forward.

As illustrated in FIGS. 2 and 6, due to the seat arrangement of the 3 passenger seat 20, when the main seat back 26 for the left seat 21 and the inner seat 22 is inclined forward in a direction of arrow E, the buckle holder 46 is rotated together with the second buckle 48 toward the front of the vehicle as indicated by arrow F to follow the main seat back 26.

That is, as the main seat back 26 is inclined forward, the buckle holder 46 is rotated in the direction of arrow F about the support pin 44 together with the second buckle 48 against the biasing force of the second spring member 47.

In addition, as the main seat back 26 is inclined forward, the first buckle 41 and the second buckle 48 (see FIG. 1) of the left seat belt device 31 are rotated toward the front of the vehicle.

In this manner, the first buckle 41 and the second buckle 48 can be rotated in the vehicle forward and rearward directions to follow the seat arrangement of the 3 passenger seat 20. Accordingly, the first buckle 41 and the second buckle 48 can be disposed at preferable positions according to the seat arrangement of the 3 passenger seat 20.

Figure 7:
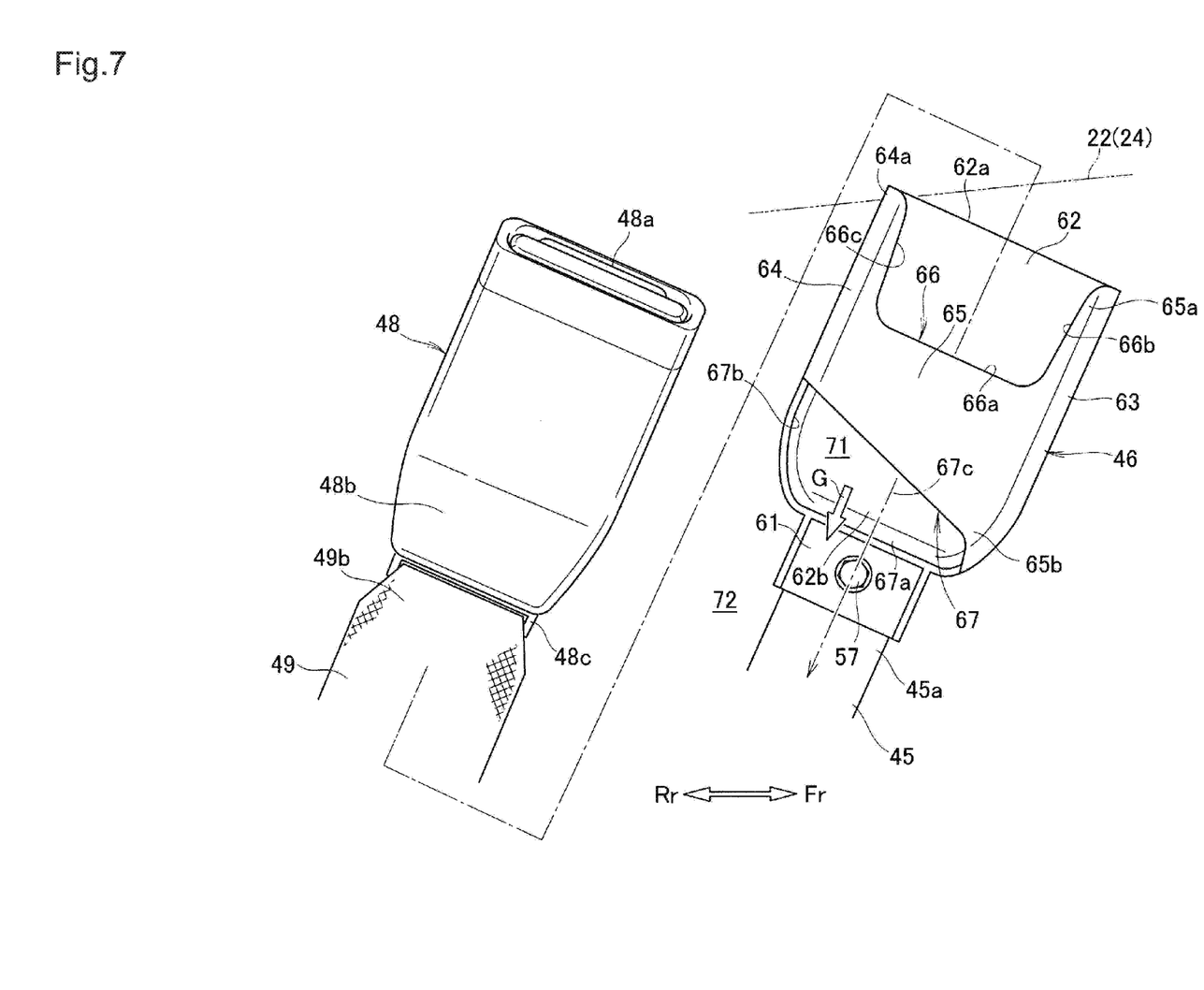
FIG. 7 is a side view illustrating a state in which a second buckle is taken out of a buckle holder of FIG. 2.

As illustrated in FIGS. 2 and 7, the buckle holder 46 is mounted to the end portion 45a of the second carrier 45. The buckle holder 46 is formed of, for example, a polypropylene resin (PP) with high strength. Therefore, the thickness dimension of the buckle holder 46 can be reduced.

Accordingly, the clearance between the buckle holder 46 and the cushion opening 53 (see FIG. 3) can be maintained.

The buckle holder 46 includes a lower mounting portion 61 mounted to the end portion 45a of the second carrier 45 with a bolt 57, an inner holder wall 62 raised upward from the lower mounting portion 61, a front holder wall 63 which extends toward the outside in the vehicle width direction from the front edge of inner holder wall 62, a rear holder wall 64 which extends toward the outside in the vehicle width direction from the rear edge of the inner holder wall 62, and an outer holder wall 65 that connects the front holder wall 63 and the rear holder wall 64.

The inner holder wall 62 is formed on the inside in the vehicle width direction (that is, on the inner seat 22 side). In addition, the outer holder wall 65 is formed on the outside in the vehicle width direction (that is, on the side opposite to the inner seat 22). Furthermore, the front holder wall 63 is formed on the front side of the vehicle. Moreover, the rear holder wall 64 is formed on the rear side of the vehicle.

The buckle holder 46 is formed in a substantially rectangular tube shape by the inner holder wall 62, the outer holder wall 65, the front holder wall 63, and the rear holder wall 64. The second buckle 48 is accommodated in the buckle holder 46 so as to be pulled out from above, and the second buckle 48 is held in a state of being accommodated in the buckle holder 46.

In addition, a holder recessed portion (recessed portion) 66 is formed in an upper end portion 65a of the outer holder wall 65. The holder recessed portion 66 is formed in a substantially U shape so as to be recessed downward at a bottom edge 66a, a front edge 66b, and a rear edge 66c. A portion (the outer surface side) of a base end portion 48b of the second buckle 48 is received by the holder recessed portion 66.

Therefore, when the second buckle 48 is pulled out for use, a portion of the base end portion 48b of the second buckle 48 is received by the holder recessed portion 66.

Accordingly, the degree of freedom of disposing the second buckle 48 in a direction away from the inner seat 22 (see also FIG. 1) can be increased. Therefore, when the right seat belt device 30 is used for occupants of various builds sitting in the inner seat 22, the second buckle 48 can be applied to the occupants of various builds and be disposed at a suitable position.

Furthermore, a holder opening (opening) 67 is formed in a base end portion 65b of the outer holder wall 65. The holder opening 67 has a bottom edge 67a, a rear edge 67b, and an upper edge 67c. The upper edge 67c is formed to have an upward gradient from the front of the vehicle toward the rear of the vehicle. Therefore, the holder opening 67 is formed in a substantially triangular shape by the bottom edge 67a, the rear edge 67b, and the upper edge 67c.

In this way, the holder opening 67 is formed in the lower portion of the outer holder wall 65. Therefore, the second webbing 49 of an inside 71 of the buckle holder 46 can be moved from the holder opening 67 toward an outside 72 of the buckle holder 46 as indicated by arrow G.

Accordingly, when the second buckle 48 is accommodated in the inside 71 of the buckle holder 46, the second webbing 49 in the buckle holder 46 can be released to the outside 72 of the buckle holder 46. As the second webbing 49 is released to the outside 72, the second buckle 48 can be smoothly accommodated in the inside 71 of the buckle holder 46.

Here, the mounting bracket 51 is disposed on the rear side of the vehicle with respect to the holder opening 67. Therefore, the second webbing 49 of the inside 71 of the buckle holder 46 moves toward the outside 72 of the buckle holder 46 in a state of being brought close to the vehicle rear side of the holder opening 67.

Therefore, the upper edge 67c of the holder opening 67 is formed to have an upward gradient from the front of the vehicle toward the rear of the vehicle. Therefore, the vehicle rear side of the holder opening 67 is opened largely. Accordingly, the second webbing 49 of the inside 71 of the buckle holder 46 can be released toward the outside 72 of the buckle holder 46 more favorably.

However, as illustrated in FIG. 6, in a state in which the main seat back 26 is inclined forward, the second buckle 48 (see FIG. 2) is brought into contact with the side surface of the main seat back 26. Therefore, it is conceivable that when the main seat back 26 is raised from the state of being inclined forward toward the rear of the vehicle, the second buckle 48 moves together with the main seat back 26 toward the rear of the vehicle and comes out of the buckle holder 46.

Therefore, as illustrated in FIG. 7, an upper edge 62a of the inner holder wall 62 extends in parallel to a lower edge 62b, and the inner holder wall 62 is formed in a substantially rectangular shape in aside view. Therefore, an upper end portion 64a of the rear holder wall 64 is raised upward (see also FIG. 5(b)).

Accordingly, for example, when the main seat back 26 is raised from the state of being inclined forward (see FIG. 6) toward the rear of the vehicle, the movement of the second buckle 48 together with the main seat back 26 toward the rear of the vehicle body can be prevented by the end portion 64a of the rear holder wall 64. Therefore, the second buckle 48 can be prevented from coming out of the buckle holder 46.

Figure 8:
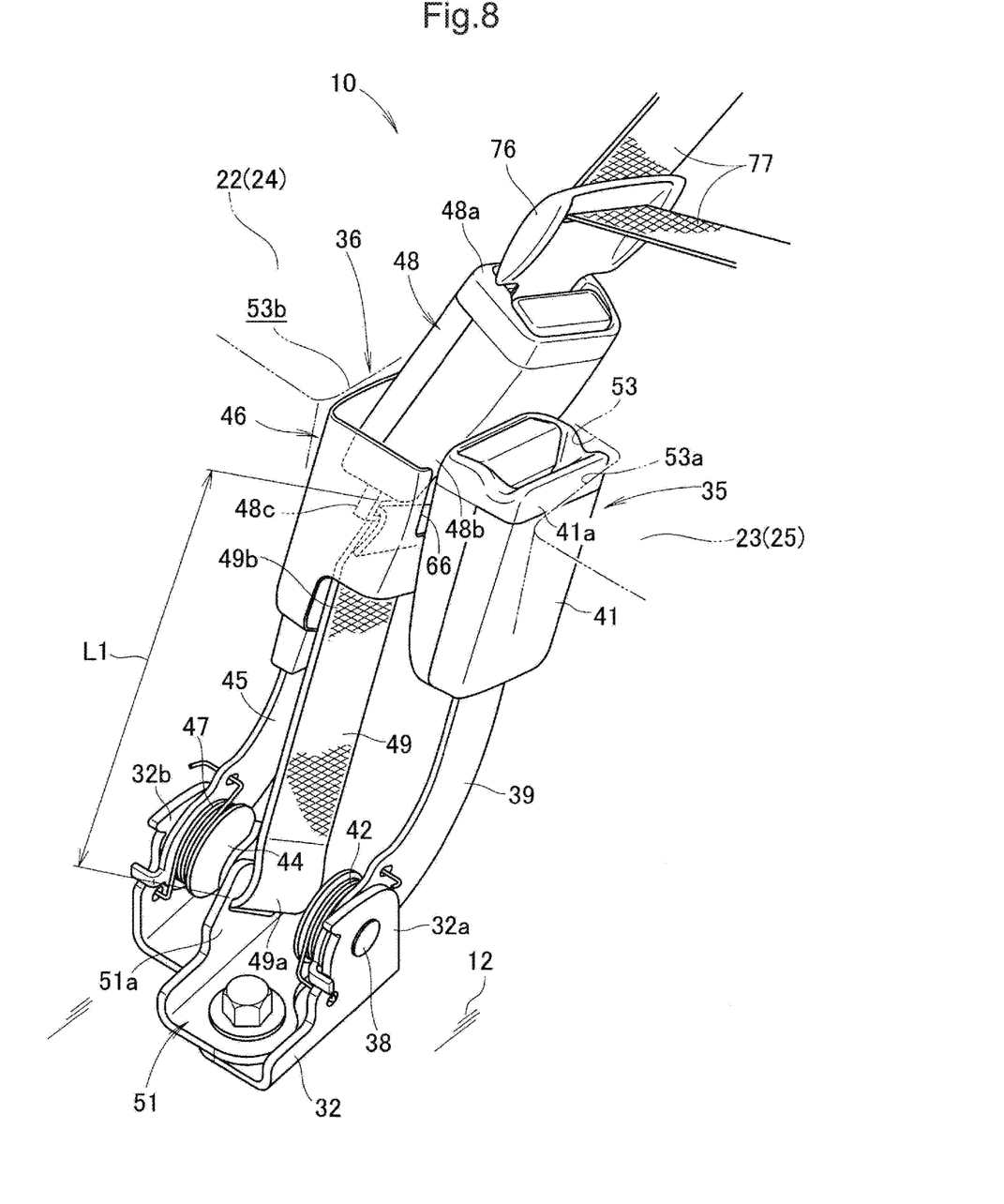
FIG. 8 is a perspective view illustrating a state in which the second buckle is pulled out from the buckle holder of FIG. 2.

As illustrated in FIGS. 2 and 8, the second buckle 48 is connected to the mounting bracket 51 by the second webbing 49. Specifically, abase end portion 49a of the second webbing 49 is connected to amounting portion 51a of the mounting bracket 51. In addition, an end portion 49b of the second webbing 49 is connected to a mounting portion 48c (see FIG. 3) of the second buckle 48.

As illustrated in FIG. 3, in a state in which the mounting bracket 51 is mounted to the anchor 32, the mounting portion 51a of the mounting bracket 51 is disposed within a holder width W1. The holder width W1 is the width of the buckle holder 46 in the vehicle width direction.

Therefore, the base end portion 49a of the second webbing 49 is connected to the mounting portion 51a of the mounting bracket 51 in a state of being disposed within the holder width W1.

Furthermore, as illustrated in FIG. 8, the second webbing 49 is formed to have a length dimension L1. The length dimension L1 of the second webbing 49 is set to a length that enables the second buckle 48 to be pulled upward from the buckle holder 46.

Therefore, for example, in a case where an occupant of large build sitting in the inner seat 22 uses the seat belt means 36 for the inner seat 22, the second buckle 48 can be pulled upward from the buckle holder 46 and disposed on the outside (side) in the vehicle width direction of the occupant.

Accordingly, a tongue 76 can be inserted into the second buckle 48 and the seat belt means 36 for the inner seat 22 can be used. The tongue 76 is connected to the first webbing 77. Therefore, as the tongue 76 is inserted into the second buckle 48, the occupant in the inner seat 22 (see also FIG. 1) can be secured by the first webbing 77.

Furthermore, even in a case where a child seat is mounted on the inner seat 22, the second buckle 48 can be pulled out from the buckle holder 46 and disposed on the outside (side) in the vehicle width direction of the child seat. As a result, the child seat can be mounted using the second buckle 48.

Returning to FIG. 3, the base end portion 49a of the second webbing 49 is connected to the mounting portion 51a of the mounting bracket 51 in a state of being disposed within the holder width W1. Therefore, for example, when a frontal collision occurs during use of the second webbing 49 and the second buckle 48 is pulled upward from the buckle holder 46 (see FIG. 8), it becomes difficult for the second webbing 49 to interfere with the buckle holder 46.

Accordingly, the possibility that a high load may be applied to the buckle holder 46 by the second webbing 49 can be prevented. Therefore, for example, in the case of a frontal collision, the buckle holder 46 can be prevented from being damaged by the interference of the second webbing 49.

The seat belt device according to the present invention is not limited to the above-described embodiment, and appropriate modifications and improvements thereof can be made.

For example, in the above-described embodiment, an example in which the upper edge 62a of the inner holder wall 62 extends in parallel to the lower edge 62b and the rear holder wall 64 is raised upward is described, but, the present invention is not limited thereto. For example, the upper edge 62a of the inner holder wall 62 can also be inclined downward toward the rear of the vehicle body.

Therefore, in a state in which the buckle holder 46 is disposed at the position of FIG. 7, the upper edge 62a of the inner holder wall 62 is disposed substantially parallel to the upper surface of the main seat cushion 24.

In addition, in the above-described embodiment, an example in which the right seat belt device 30 is applied to the inner seat 22 is described, but the present invention is not limited thereto. For example, the right seat belt device 30 can also be applied to other seats such as the left seat 21 and the right seat 23.

Furthermore, the shapes and configurations f of the vehicle, the inner seat, the right and left seat belt devices, the buckle holder, the second buckle, the second webbing, the outer holder wall, the holder recessed portion, the holder opening, the tongue, and the first webbing, in the above-described embodiment, are not limited to the examples, and can be appropriately modified.

INDUSTRIAL APPLICABILITY

The present invention is suitable for application to an automobile provided with a seat belt device which holds a webbing with a buckle to secure an occupant sitting in a seat with the webbing.

DESCRIPTION OF REFERENCE NUMERALS 10 vehicles
22 inner seat (recessed portion)
30, 31 right and left seat belt devices (seat belt device)
46 buckle holder
48 second buckle (buckle)
49 second webbing
65 outer holder wall
65a upper end portion of outer holder wall (upper end portion of buckle holder)
65b base end portion of outer holder wall (base end portion of buckle holder)
66 holder recessed portion (seat recessed portion)
67 holder opening (opening)
71 inside of buckle holder
72 outside of buckle holder
76 tongue
77 first webbing
W1 holder width

The invention claimed is:

1. A seat belt device provided in a vehicle, comprising:
a first webbing to secure an occupant in the vehicle, said first webbing having a tongue connected thereto;
a buckle into which the tongue connected to said first webbing can be inserted and which is connected to a vehicle side;
a second webbing connected to said buckle and connected to said vehicle side; and
a tubular buckle holder configured to hold the buckle in a state in which the buckle is accommodated therein and is provided in said vehicle and to be rotatable in vehicle forward and rearward directions, said buckle holder having a rear holder wall and an outer holder wall which is formed at a side opposite to a seat in which the occupant is seated, wherein said second webbing is set to have a length such that said buckle can be pulled out from said buckle holder and connected to said vehicle side at a position which is a rear side with respect to a center line of said buckle holder in the vehicle forward and rearward directions when viewed from a vehicle width direction, and wherein said buckle holder has an opening formed in a base end portion of the outer holder wall and the rear holder wall, the opening continuously extending from a rear side end of the outer holder wall in the vehicle forward and rearward directions and further extending in the rear holder wall toward a side of said seat in the vehicle width direction, such that said second webbing in said buckle holder is able to move to outside of said buckle holder through the opening.

2. The seat belt device according to claim 1, wherein said buckle holder has a holder body width in the vehicle width direction, and said second webbing is connected to said vehicle side at a position within the holder body width of said buckle holder.

3. The seat belt device according to claim 2, wherein said second webbing is connected to said vehicle side at a position between a center of the holder body width and the outer holder wall which is said side opposite to the seat in which the occupant is seated.

4. The seat belt device according to claim 1, wherein said buckle holder has a recessed portion which is formed in an upper end portion of the buckle holder and recessed downward to receive the tongue connected to said first webbing, the recessed portion being formed on a side opposite to a seat in which the occupant is seated.

5. The seat belt device according to claim 4, wherein said recessed portion is formed in such dimension that a base end portion of the buckle is received by said recessed portion.

6. The seat belt device according to claim 1, wherein an upper edge of said opening is formed with upward inclination from a front side toward a rear side of the upper edge in the vehicle forward and rearward directions.

7. The seat belt device according to claim 6, wherein the seat belt device is configured to hold the buckle holder in such inclined position that a portion of the buckle into which the tongue of the first webbing is inserted is faced upward and toward a front side of the vehicle.

8. The seat belt device according to claim 1, further comprising a mounting portion which extends upward, an end portion of the second webbing being inserted into a hole formed in the mounding portion so as to connect the second webbing to the vehicle side.

9. The seat belt device according to claim 1, wherein said opening further extends in a front holder wall of said buckle holder, an upper edge of said opening being formed with downward inclination toward a side of said seat in which the occupant is seated.

* * * * *